SUBSCRIBER RINGING IN CARRIER TELEPHONE SYSTEMS

Filed April 17, 1958

2 Sheets-Sheet 1

INVENTORS A. L. BONNER
J. C. DONALDSON
BY R. B. Ardis
ATTORNEY

INVENTORS A. L. BONNER
J. C. DONALDSON
BY R. B. Anderson
ATTORNEY 2,939,919

SUBSCRIBER RINGING IN CARRIER TELEPHONE SYSTEMS

Arthur L. Bonner, Andover, and John C. Donaldson, Methuen, Mass., assignors to Bell Telephone Laboratories, Incorporated, New York, N.Y., a corporation of New York Filed Apr. 17, 1958, Ser. No. 729,134

5 Claims. (Cl. 179—86)

Figure 1:
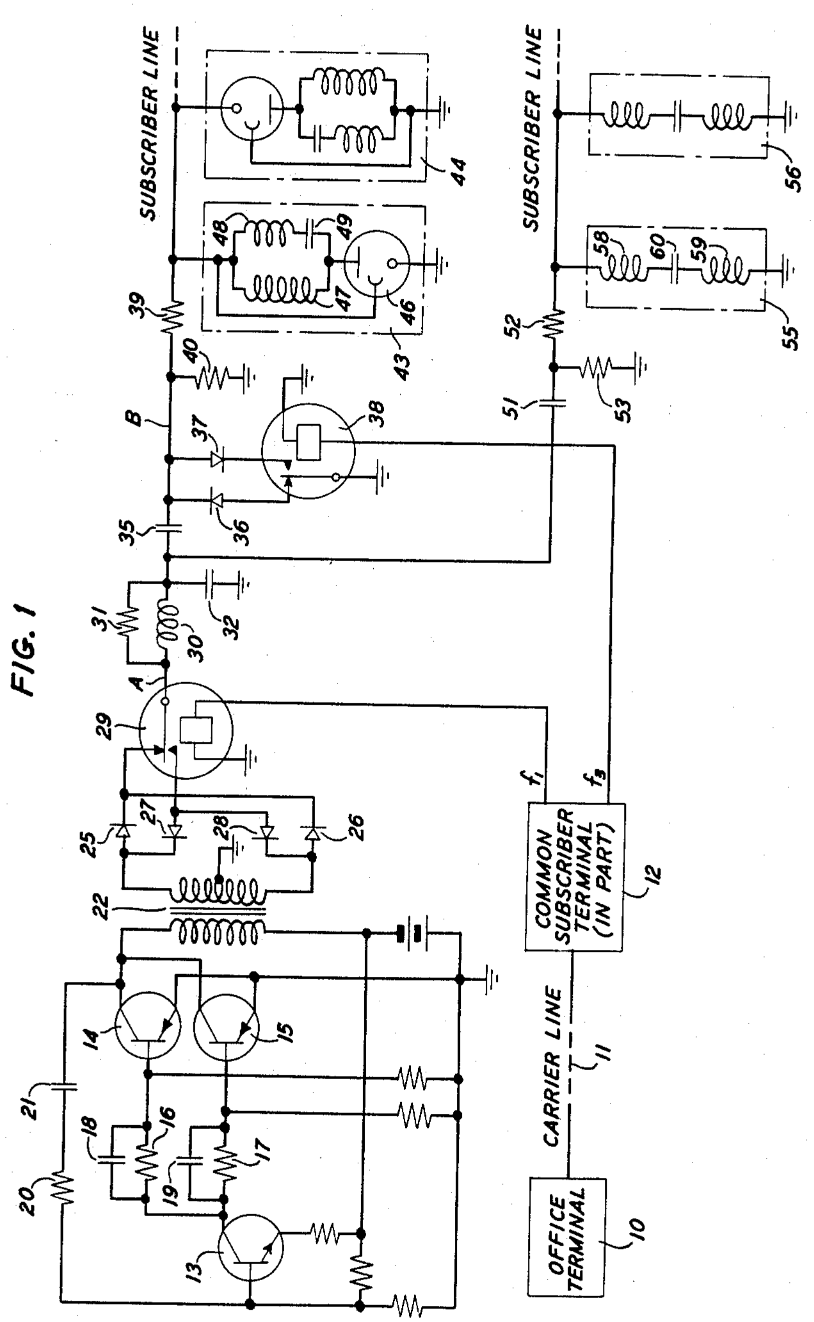

This invention relates generally to the supply of ringing current to subscriber telephone sets and more particularly to the supply of ringing current to such sets in a subscriber carrier telephone system.

One object of the invention is to permit the use of extension telephones on a multiparty line in a subscriber carrier telephone system.

A related object is to increase the number of telephone ringers that can be operated simultaneously on a single line in a subscriber carrier telephone system.

Another object of the invention is to increase the ringing power available at a common subscriber terminal in a subscriber carrier telephone system without increasing the direct-current power supplied to the local ringing current generator.

A further object is to increase the conversion efficiency of the ringing power supply at the common subscriber terminal in a subscriber carrier telephone system.

In a subscriber carrier telephone system of the type disclosed in United States Patent 2,763,726, issued September 18, 1956, to D. C. Weller, the standard subscriber ringing signals generated at the central office are coded in terms of the presence or absence of a plurality of voice frequency tones at the office carrier terminal. At the remote or common subscriber carrier terminal, these tones are recovered and used to recreate locally the standard subscriber ringing signals generated at the central office. The reconstituted ringing signals are then available for transmission to the called subscriber telephone sets over ordinary voice frequency telephone lines just as if there were no intervening carrier link.

At the common subscriber terminal in one version of the carrier system disclosed in the above-mentioned Weller patent, the original ringing signal is reconstituted with the aid of a local high frequency oscillator, the output of which is converted to direct current by a selected one of two oppositely poled rectifiers and then pulsed at the ringing frequency rate to give a series of single polarity ringing pulses. The rectifier selected, and hence the polarity of the direct current, is determined by the presence or absence of one of the voice frequency tones received from the office terminal and the resulting direct current is then pulsed under the control of another. In practice, these single polarity ringing pulses are used to operate alternating-current capacitor-coupled ringers as well as polarity-sensitive direct-current gas tube ringers. The conversion efficiency in going from high frequency alternating current to single polarity ringing pulses is, however, only of the order of 30 to 40 percent. Unless the power capacity of the local high frequency generator is substantially increased, there is usually insufficient power in the reconstituted ringing pulses to operate more than a few ringers of either type simultaneously. The system tends, therefore, to be somewhat limited in the number of extension telephones that may be used on any one subscriber line.

The present invention overcomes these limitations of the existing system without the requirement of additional circuitry. In accordance with one feature of the present invention, the local high frequency generator is provided with a pair of oppositely poled rectifiers and a relay is employed to switch from one rectifier to another at the ringing frequency rate yielding alternating current of the ringing frequency (usually of the order of twenty cycles per second). In accordance with another important feature of the invention, one side of a storage capacitor is connected to receive the ringing frequency alternating current, a pair of oppositely poled clamper diodes are connected across the subscriber line on the other side of the storage capacitor, and a second relay is employed to activate either one or the other of the clamper diodes in response to the presence or absence of the polarity-indicating tone received from the office terminal. Since it is of substantially twice the magnitude of the pulses obtained from a single rectifier in the existing system, the ringing frequency alternating-current wave at the rectifier relay need not pass through the capacitor, clamper diode combination but may instead by applied directly to operate a number of capacitor-coupled ringers simultaneously. For gas tube ringers, regardless of which of the pair of clamper diodes is activated, the half cycles of ringing frequency alternating current of one polarity place a charge on the storage capacitor which aids those half cycles of the opposite polarity. In this manner, the amplitude of the single polarity pulses supplied to the gas tube ringers is approximately doubled and the number of polarity-sensitive gas tube ringers that can be operated simultaneously on a single line is substantially increased. For both types of ringers, the invention thus substantially doubles the conversion efficiency of the common subscriber terminal ringing power supply, bringing it at least to the order of 80 percent.

Figure 2:
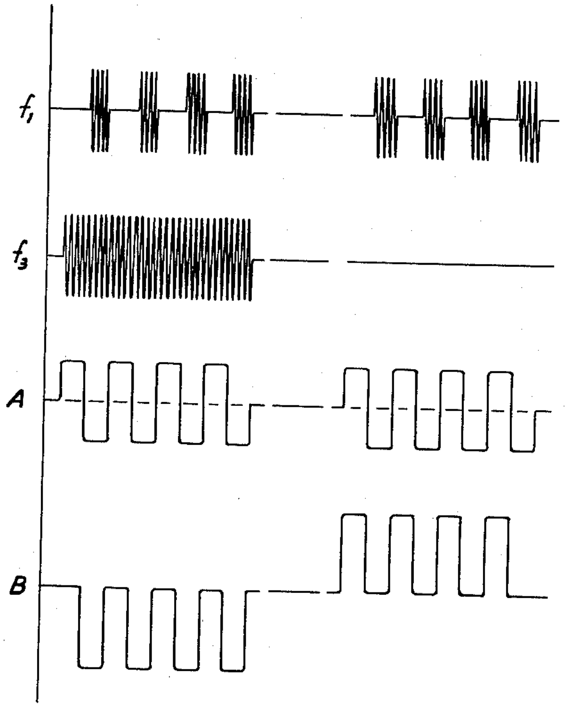

A more complete understanding of the invention may be obtained from a study of the following detailed description of one specific embodiment. In the drawings:

Fig. 1 illustrates in detail a portion of a common subscriber terminal ringing current supply embodying the present invention; and Fig. 2 shows a series of waveforms illustrating the mode of operation of the embodiment of the invention shown in Fig. 1.

A subscriber carrier telephone system of the type to which the invention is applicable is shown in Fig. 1 as constituting an office terminal 10 connected by a carrier line 11 to a portion 12 of the common subscriber terminal. The common subscriber terminal is so called because it serves all of the subscribers on a single multiparty telephone line and includes, among other things, circuitry for reconstructing on the subscriber line the ringing signals generated at the central office and there applied to the office terminal of the carrier system. For more complete system details, reference may be made to the previously mentioned Weller patent, Figs. 3 and 7 of which illustrate a preferred common subscriber terminal of the type to which the present invention is applicable. The remainder of the present Fig. 1 illustrates the rest of the terminal and a ringing current supply for such a terminal which embodies the present invention and makes possible a substantial increase in the number of telephone ringers that can be operated simultaneously. Ringing current paths only are shown in Fig. 1, since the above-mentioned Weller patent contains a sufficient description of the speech and other signaling paths.

The local high frequency oscillator in Fig. 1 is substantially the same as the high frequency relaxation oscillator shown in Fig. 7 of the Weller patent and in Fig. 1 of copending application Serial No. 462,153, filed October 14, 1954, by D. C. Weller, now U.S. Patent No. 2,831,113, issued April 15, 1958, but contains an alternative output stage. That stage consists of two transistors instead of one in order to avoid too heavy a load on a single output transistor. Basically, the oscillator is made up of a first stage transistor 13 of one conductivity type and a pair of output stage transistors 14 and 15 of the opposite conductivity type. Both stages are of the so-called common emitter configuration and the emitter and collector electrodes of transistors 14 and 15 in the output stage are connected in parallel. The base electrodes, on the other hand, are respectively coupled to the collector electrode of first stage transistor 13 through a pair of resistors 16 and 17 which are partially bypassed by respective capacitors 18 and 19. The resistances of resistors 16 and 17 are large with respect to the internal emitter-base resistances of transistors 14 and 15 and are approximately equal to each other, causing the driving current from the collector electrode of the first stage to split itself substantially equally between the two transistors regardless of differences in their individual operating characteristics. The possibility of burn-out because of one transistor carrying more than its proportionate share of the load is thereby avoided.

The remainder of the high frequency path of the oscillator is principally a feedback path including a series resistor 20 and timing capacitor 21 connected from the collector electrodes of transistors 14 and 15 to the base electrode of transistor 13. In addition, the primary winding of an output transformer 22 is returned from the collector electrodes of both output transistors 14 and 15 to a negative source of direct potential.

Connected to the secondary winding of transformer 22 in Fig. 1 are four diodes 25 through 28 which constitute a pair of oppositely poled full-wave rectifiers. Since in the illustrated example one side of the subscriber line is grounded, a grounded center tap is provided on the secondary winding of transformer 22 and the two ends of the winding are connected through a pair of similarly poled diodes 25 and 26 to the back contact of a fast acting mercury type relay 29. From the same two ends of the line another pair of like poled diodes 27 and 28 are connected to the front contact of relay 29. Diodes 27 and 28 are, however, poled oppositely from diodes 25 and 26.

The voice-frequency tones recovered from carrier line 11 in Fig. 1 include an interrupted tone $f_1$ which is transmitted by office terminal 10 whenever a ringing signal is applied at the central office and a steady tone $f_3$ which is transmitted whenever the direct component of the office ringing signal is of a particular polarity (e.g., positive). Tone $f_1$ is interrupted at a ringing frequency rate (e.g., 20 cycles per second) to match the frequency of the ringing signal generated at the central office. Waveforms of these tones are shown in the top two lines of Fig. 2. The designations and significance of both tones are, for the sake of consistency, preserved from Figs. 7 and 8 of the above-identified Weller patent. The third tone used in the Weller system has not been made use of in the present disclosure, although it is fully intended that it may be in accordance with that disclosure whenever ringing distinction is to be made between the so-called ring and tip sides of the subscriber line.

In accordance with a principal feature of the invention, relay 29 is operated at the ringing frequency rate (e.g., 20 cycles per second) in response to the "when to ring" tone $f_1$ received from the carrier line 11 at the common subscriber terminal. As shown in Fig. 1, tone $f_1$ is applied to the operating coil of relay 29 whenever it is received, causing the armature of relay 29 to switch back and forth between the two oppositely poled rectifiers and to produce at point A the ringing frequency alternating-current wave shown in the third line of Fig. 2.

The alternating-current wave at point A in Fig. 1 is passed through a low-pass filter made up of a series arm consisting of a parallel inductor 30 and resistor 31 and a shunt arm consisting of a capacitor 32. Beyond the filter there are two alternatives, depending upon the type of ringer used on the subscriber line. Two types of telephone ringers that may be used are the polarity-sensitive direct-current gas tube ringer and the alternating-current capacitor-coupled ringer. The former is generally used on multiparty lines when at least some degree of selectivity is desired. The latter is used on multiparty lines when distinction between parties merely by ringing codes is acceptable and on private lines either with or without extension telephone sets.

In accordance with another principal feature of the invention, for gas tube type ringers the low-pass filter output is connected to the subscriber line through a storage capacitor 35 and a pair of oppositely poled clamper diodes 36 and 37. From storage capacitor 35, clamper diodes 36 and 37 are connected one to the back contact and the other to the front contact of a polarity control relay 38. The armature of relay 38 is connected to the other side of the subscriber line (ground in the illustrated example) and, as illustrated, the "polarity" tone $f_3$ is applied to the operating coil whenever received.

The storage capacitor and clamper diodes featured by the invention function as a polarity-selective voltage doubler, which utilizes half cycles of both polarities of the alternating-current wave at point A to energize polarity-sensitive gas tube ringers. When the tone $f_3$ is present, polarity control relay 38 operates, disabling diode 36 for the duration of the ringing signal and activating diode 37. As shown in the left-hand column of Fig. 2, the presence of tone $f_3$ thus produces at point B a succession of negative-going pulses of direct current having a magnitude substantially twice the amplitude of the alternating-current wave at point A. These enlarged direct-current pulses are shown in the bottom line of Fig. 2 and come about in the following way. Each positive half cycle passing through storage capacitor 35 is shunted to ground by diode 37 but leaves a charge on the capacitor. The polarity of this charge is such that it aids the next succeeding negative half cycle. The resulting enlarged negative half cycle is of the wrong polarity to pass through diode 37 and thus appears at point B for transmission out over the subscriber line. In the absence of the tone $f_3$, the operation is the same, but diode 36 is activated instead of diode 37 and the charge left on storage capacitor 35 by the negative half cycles of the alternating-current wave aids the positive half cycles, as shown on the bottom line of the right-hand column of Fig. 2.

Beyond point B in the embodiment of the invention illustrated in Fig. 1 are a resistance pad made up of a series resistor 39 and a shunt resistor 40 (representing line and leakage resistance, respectively) and a plurality of gas tube type ringers, exemplified by ringers 43 and 44. Ringer 43 is connected to be operated by positive ringing pulses and is shown schematically as comprising a gas tube 46 and a parallel resonant circuit made up of an inductor 47 in one arm and the series combination of an inductor 48 and a capacitor 49 in the other. The gas tube 46 has its cathode grounded, its starter anode connected to the line, and its operating anode connected to the line through the parallel resonant circuit. In operation, voltages on the starter anode above a critical anode cause ionization of gases and permit current to flow through the tube in the direction from anode to cathode. The parallel resonant circuit is resonant at the ringing frequency. Ringer 44 is similar but inverted so that it is operated by negative ringing pulses.

As has already been explained, the embodiment of the invention illustrated in Fig. 1 serves to extend considerably the scope of service that can be offered with a subscriber carrier telephone system of the type illustrated in the Weller patent. Larger and more powerful ringing pulses are provided for transmission to polarity-sensitive gas tube ringers without any requirement for an increase in the locally generated ringing power, enabling more subscriber telephone sets to be rung simultaneously and extension telephone service to be offered to the public in places where it could not have been offered previously. In addition, however, it permits more efficient use of the locally generated ringing power to operate alternating-current capacitor-coupled ringers, either simultaneously with a limited number of gas tube type ringers or by themselves.

One of the several advantages offered by the invention is, in fact, this more efficient operation of either gas tube or capacitor-coupled ringers, either in combination or separately.

For capacitor-coupled ringers, the alternating-current output of the low-pass filter in Fig. 1 is supplied directly to the subscriber line through a coupling capacitor 51 and a resistance pad made up of a series resistor 52 and a shunt resistor 53 (representing line and leakage resistance, respectively). The coupling capacitor is not strictly necessary, but serves to block direct currents from the subscriber line or the portion of it containing alternating-current ringers. Beyond the resistance pad, a pair of capacitor-coupled ringers 55 and 56 are shown schematically connected between the subscriber line and ground. Ringer 55 is shown, for example, as a series resonant circuit made up of two inductors 58 and 59 and a capacitor 60. As in the gas tube ringers, the resonance is at the ringing frequency.

Since more efficient use is made of the rectified alternating current derived from the high frequency relaxation oscillator in the embodiment of the invention illustrated in Fig. 1, a substantial power benefit is shown for alternating-current as well as polarity-sensitive direct-current ringers. The alternating-current ringing signals provided for capacitor-coupled ringers are considerably more effective than the single polarity pulses provided by previous subscriber carrier systems arranged to operate both types of ringer and a substantially increased number of capacitor-coupled ringers can be operated simultaneously. Again, the variety of telephone service that it is possible to offer the public is increased with no corresponding increase in system complexity.

It is to be understood that the above-described arrangement is illustrative of the application of the principles of the invention. Numerous other arrangements may be devised by those skilled in the art without departing from the spirit and scope of the invention.

What is claimed is:

1. In a telephone system, an arrangement for energizing both alternating-current and polarity-sensitive direct-current ringers with maximum efficiency which comprises a pair of sources of direct current of opposite polarity, an output connection for said sources of direct current, a first relay connected to shift said output connection back and forth between said sources of direct current at a ringing frequency rate, means to couple said output connection to a plurality of alternating-current ringers, means including a storage capacitor to couple said output connection to a plurality of polarity-sensitive direct-current ringers, a pair of oppositely poled shunt limiters connected between said storage capacitor and said direct-current ringers, and a second relay connected to activate either one or the other of said limiters under the control of a polarity signal.

2. In a telephone system, an arrangement for energizing a plurality of polarity-sensitive direct-current ringers with maximum efficiency which comprises a pair of sources of direct current of opposite polarity, an output connection for said sources of direct current, a first relay connected to shift said output connection back and forth between said sources of direct current at a ringing frequency rate, means including a storage capacitor to couple said output connection to a plurality of polarity-sensitive direct-current ringers, a pair of oppositely poled shunt diode limiters connected between said storage capacitor and said ringers, and a second relay connected to activate either one or the other of said limiters under the control of a polarity signal.

3. In a subscriber carrier telephone system which comprises an office terminal, a common subscriber terminal, means to transmit a first tone interrupted at a ringing frequency rate from said office terminal to said common subscriber terminal to control subscriber ringing signal frequency, and means to transmit a second tone from said office terminal to said common subscriber terminal to control subscriber ringing signal polarity, an arrangement for energizing both alternating-current and polarity-sensitive direct-current ringers with maximum efficiency which comprises a pair of sources of direct current of opposite polarity, an output connection for said sources of direct current, a first relay connected to shift said output connection back and forth between said sources of direct current in response to said interrupted first tone, means to couple said output connection to a plurality of alternating-current ringers, means including a storage capacitor to couple said output connection to a plurality of polarity-sensitive direct-current ringers, a pair of oppositely poled shunt limiters connected between said storage capacitor and said direct-current ringers, and a second relay connected to activate either one or the other of said limiters under the control of said second tone.

4. In a subscriber carrier telephone system which comprises an office terminal, a common subscriber terminal, means to transmit a first tone interrupted at a ringing frequency rate from said office terminal to said common subscriber terminal to control subscriber ringing signal frequency, and means to transmit a second tone from said office terminal to said common subscriber terminal to control subscriber ringing signal polarity, an arrangement for energizing a plurality of polarity-sensitive direct-current ringers with maximum efficiency which comprises a pair of sources of direct current of opposite polarity, an output connection for said sources of direct current, a first relay connected to shift said output connection back and forth between said sources of direct current in response to said interrupted first tone, means including a storage capacitor to couple said output connection to a plurality of polarity-sensitive direct-current ringers, a pair of oppositely poled shunt diode limiters connected between said storage capacitor and said direct-current ringers, and a second relay connected to activate either one or the other of said limiters under the control of said second tone.

5. In a subscriber carrier telephone system which comprises an office terminal, a common subscriber terminal, means to transmit a first tone interrupted at a ringing frequency rate from said office terminal to said common subscriber terminal to control subscriber ringing signal frequency, and means to transmit a second tone from said office terminal to said common subscriber terminal to control subscriber ringing signal polarity, an arrangement for energizing a plurality of polarity-sensitive direct-current ringers with maximum efficiency which comprises, at said common subscriber terminal, an oscillator having an operating frequency in excess of the subscriber ringing signal frequency, a pair of oppositely poled rectifiers each connected to rectify the output of said oscillator, a common output connection for both of said rectifiers, a first relay connected to shift said output connection back and forth between said rectifiers in response to said interrupted first tone, means including a storage capacitor to couple said output connection to a plurality of polarity-sensitive direct-current ringers, a pair of oppositely poled diodes each having one side connected to the side of said storage capacitor electrically nearest said ringers, and a second relay arranged to connect the other side of either one or the other of said diodes to a point of predetermined reference potential under the control of said second tone.

References Cited in the file of this patent

UNITED STATES PATENTS

| | | |
|---|---|---|
| 2,686,227 | Ryall | Aug. 10, 1954 |
| 2,763,726 | Weller | Sept. 18, 1956 |